US005893960A

United States Patent [19]

Holt

[11] Patent Number: 5,893,960

[45] Date of Patent: Apr. 13, 1999

[54] LABEL PRINTING USING MICROPOROUS LABEL SURFACE

[75] Inventor: Richard William Holt, Lexington, Ky.

[73] Assignee: Lexmark International, Inc., Lexington, Ky.

[21] Appl. No.: 08/055,100

[22] Filed: May 3, 1993

[51] Int. Cl.$^{6}$ .......... B32B 31/14

[52] U.S. Cl. .......... 156/277

[58] Field of Search .......... 156/277

[56] References Cited

U.S. PATENT DOCUMENTS

| | | | |
|---|---|---|---|
| 3,790,703 | 2/1974 | Carley | 178/6.6 R |
| 4,861,644 | 8/1989 | Young et al. | 428/195 |
| 4,978,146 | 12/1990 | Warther | 283/81 |
| 5,140,934 | 8/1992 | Pennelle | 116/234 |

OTHER PUBLICATIONS

New Riverside University Dictionary, The Riverside Publishing Company, 1984.

Teslin® Synthetic Paper Product Brochure, PPG Industries.

*Primary Examiner*—Curtis Mayes
*Attorney, Agent, or Firm*—John A. Brady

[57] ABSTRACT

Labels are printed from a liquid ink having mineral oil by printing on a sheet having a Teslin brand synthetic paper lamination followed by an organic adhesive lamination in contact with the synthetic paper, followed by a supporting lamination. The synthetic paper can be as thin as 8 ml and no barrier layer is needed to protect the adhesive from the mineral oil.

4 Claims, No Drawings

LABEL PRINTING USING MICROPOROUS LABEL SURFACE

DESCRIPTION

1. Technical Field

This invention relates to printing on labels using liquid toner or ink having mineral oil. The labels have an outer lamination which receives the printing, a layer for support during printing, and a intermediate adhesive layer so that the printed label can be peeled from the support layer and affixed by the adhesive to ordinary surfaces.

2. Background of the Inventions

This invention is a label having no barrier layer between the print-receiving lamination and the adhesive layer. Since a liquid toner or ink containing mineral oil must be absorbed by the print-receiving medium, the print-receiving medium must be porous. Normally, that porosity results in the mineral oil reaching the adhesive and degrading its condition as an adhesive. A barrier layer prevents that, but is an additional expense in material cost and in manufacturing, as well as adding some bulk to the label.

This invention employs a known paper substitute, Teslin, a trademark product of PPG Industries, Inc., for label preparation in a lamination not having or requiring a barrier layer. U.S. Pat. No. 4,861,644 to Young et al describes what appears to be Teslin material and teaches printing on it as a paper substitute. Liquid inks and xerographic printing are both mentioned. U.S. Pat. No. 5,140,934 to Pennelle teaches a bookmark, including an embodiment in which Teslin sheets, each having an adhesive layer, are stacked. No specific mention is made of printing on the sheets.

DISCLOSURE OF THE INVENTION

Labels are printed from a liquid ink having mineral oil by printing on a sheet having a Teslin print-receiving lamination, an organic adhesive lamination contacting the Teslin lamination, and a support lamination contacting the adhesive.

The Teslin lamination immobilizes the printing to give excellent permanent printed images. The adhesive is not degraded by the mineral oil, which means the mineral oil is held from the adhesive, so the expenses and added bulk of a barrier layer are avoided.

BEST MODE FOR CARRYING OUT THE INVENTION

The present invention is a synthetic label system that accepts liquid electrophotography toners without requiring a barrier layer between the print-receiving material and the adhesive layer, and that requires no pre-treatment of the print-receiving material to enhance oil absorption. This label employs a synthetic material, such as Teslin, a trademark for microporous, plastic printing sheet. Teslin is described by its manufacturer as a polyolefin based, microporous, printing sheet with approximately 65 percent of its volume amassed as air. Another key material in Teslin is siliceous filler at approximately 60–80 percent by weight. The adhesive material is a standard organic adhesive material. The support sheet is a conventional, thick paper.

The label of this invention satisfies the following requirements of many electrophotographic printing applications. a) acceptable melting point of the materials (i.e., resistance to heat for fusing properties), b) acceptable print quality, and c) no mineral oil (toner carrier) depositions from the label, in any manner, either via the front (face stock) or the backing into the adhesive layer. Along with the tremendous amount of surface area produced via the microporous structure, the material plays a key role in mineral oil absorption, which inhibits residual mineral oil from escaping the material. Also important to this point is that the use of a lower vapor pressure mineral oil is significant to elimination of emissions (i.e.; emissions into the printer's immediate surroundings—office space) that may result from the use of a more volatile hydrocarbon carrier. If the oil were not "trapped" by the material, however, two undesirable consequences may result. First, oil which escapes via the face stock could cause a condensation/evaporation phenomenon hereafter named an "oil slick," most often seen with lower volatility mineral oils. An oil slick may cause undesirable oily surfaces, swelling of certain commercially available binders and notebooks, and poor fuse grade (fuse grade is a comprehensive term for resistance of final printing to removal) as a result of residual oil on, or near the face stock, contacted by the toner. Amounts of mineral oil sufficient for creating oil slick are present in Teslin for three weeks after mineral oil introduction onto its surface. Oil slicking and adhesive break down, however, do not occur due to the absorption of oil by the Teslin. The amount of mineral oil needed to cause an oil slick is approximately 50 ug/sq.cm.

Mineral oil "capture" also plays an important role in this invention due to fuse grading. Fuse grade may be judged on all liquid electrophotographic toners as well as potential surfaces that these toners may come in contact with. Therefore, fuse grading is a standard measure of comparison for print samples. A fuse grade and transfer study was completed on all commercially available synthetic labels (transfer is defined as the percentage of all toner of an image transferred from a transfer roller receiving the image from an accumulator roller to paper). Final printing is abraded with a blade edge and with a weighted cloth. According to this study, fuse grade increased by twenty to twenty-five percent on average given the best conditions of printing and some labels had 100 percent improvement.

Teslin synthetic paper gives virtually perfect fuse grading. Only destruction of the print-receiving material itself allowed for fusing to be compromised. Transfer also increased by one to ten percent on average given the best conditions of printing and some labels had 100 percent improvement. Transfer, according to typical procedures, also gave perfect percentages (100%) with this invention. This is surprising because both fuse grade and transfer generally tend to correlate with resin, oil, and additive selection. However, with the use of Teslin synthetic paper there seems to be no difference in fuse grade across a large range of all three variables. Other properties of the Teslin material to support this invention are melting point, which is sufficiently high to support fusing conditions (i.e.; pressure and heat) in a liquid electrophotographic printer or copier. Print quality was not effected by the choice of this print-receiving material. This is especially important when one considers bar coding and other graphics as potential applications for such a label.

The Teslin synthetic paper can be as thin as 8 mils and no barrier layer is needed to protect the adhesive from the mineral oil.

REPRESENTATIVE INK

A representative ink in accordance with this invention is a liquid toner used in electrophotographic imaging. It comprises mineral oil as a vehicle, fine particles of a resin, which may be a blend including an ionomeric resin, pigment, aluminum tristearate and a separate charge control mixture added at a final stage of manufacture. An illustrative charge control mixture is lecithin, N-methyl-2-pyrrolidone, and calcium Petronate (trademark) as a 10%–30% solution in mineral oil.

The ionomeric resin may be Surlyn 9020 (trademark) in an amount by weight of twice a non-ionic resin blended with ink. Thirty-five parts by weight of this mixture may be mixed with 65 parts by weight of a highly purified, food grade mineral oil consisting of a mixture of straight chained and branched alkanes. This is mixed thoroughly until the resins are thoroughly mixed and plasticized with mineral oil, and all of the mineral oil is completely incorporated into the resulting solid.

The product is solidified and ground if necessary, after which is added pigments, aluminum tristearate and additional of the mineral oil in an amount to bring the total mineral oil content to 80 to 90% by weight. This is attributed to a final mixture having volume average particle diameter measured using a Shimadzu centrifugal particle size analyzer of about 1 to 3 microns. After the attrition the mixture is diluted with mineral oil to two percent solids with stirring.

Representative pigments are by weight for a black toner about 22% carbon black, as well 2% NBS6157 violet dye and for cyan toner about 17% Toyo FG7341 pigment.

For charge control a mixture of lecithin, 2-methyl-N-pyrrolidone, and calcium Petronate in a 10–30% solution until conductivity of approximately 50 picomhos/cm is reached. The three elements may be in roughly equal amounts, and roughly 2 ml of this charge control mixture is required to charge 100 ml of the resin mixture.

Although the foregoing toner is described in some detail, it should be considered representative only, since this invention is not restricted to the details of ink formulation. In particular, this invention functions well with mineral oils of higher viscosity than contemplated for this foregoing representative ink.

Modifications of the foregoing embodiment will be apparent or can be expected, within the spirit and scope of this invention.

What is claimed is:

1. The method of preparing labels having an organic adhesive backing degradable by mineral oil for affixing said labels to surfaces comprising printing on a print-receiving lamination with imaging ink or toner containing mineral oil as a vehicle, said print-receiving lamination being in contact with a lamination of said adhesive, and said adhesive being contacted by a supporting lamination, said print-receiving lamination being of a porous material which holds said mineral oil of said ink or toner in the pores of said porous material away from said adhesive.

2. The method as in claim 1 in which said material of said print-receiving lamination is a porous polyolefin base having a major amount of siliceous filler.

3. The method as in claim 2 in which said material of said print-receiving lamination is microporous plastic sheet.

4. The method as in claim 3 in which said material of said print-receiving lamination is in the order of magnitude of 0.008 of an inch thick.

* * * * *